US012801124B2

(12) United States Patent
Raza et al.

(10) Patent No.: US 12,801,124 B2
(45) **Date of Patent: *Nov. 17, 2026**

(54) INDUSTRIAL BOTTLENECK DETECTION AND MANAGEMENT METHOD AND SYSTEM

(71) Applicant: THROUGHPUT, INC., Palo Alto, CA (US)

(72) Inventors: Ali Hussan Raza, Breinigsville, PA (US); Bhaskar Subbarao Ballapragada, Sammamish, WA (US); Seth Rom Page, Tucson, AZ (US); Anzar Kamdar, Poznan (PL)

(73) Assignee: THROUGHPUT, INC., Palo Alto, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 18/239,190

(22) Filed: Aug. 29, 2023

(65) Prior Publication Data

US 2023/0409014 A1 Dec. 21, 2023

Related U.S. Application Data

(63) Continuation of application No. 17/268,255, filed as application No. PCT/US2019/050290 on Sep. 10, 2019.

(60) Provisional application No. 62/729,729, filed on Sep. 11, 2018.

(51) Int. Cl.

| | |
|---|---|
| ***G05B 19/418*** | (2006.01) |
| ***G06Q 10/0637*** | (2023.01) |

(52) U.S. Cl.

CPC .................. *G05B 19/41865* (2013.01); *G06Q 10/0637* (2013.01); *G05B 2219/32015* (2013.01); *G05B 2219/32191* (2013.01)

(58) Field of Classification Search

CPC .... G05B 19/41865; G05B 2219/32015; G05B 2219/32191; G05B 23/0221; G05B 2219/24065; G05B 13/0205; G06Q 10/0637; Y02P 90/02

See application file for complete search history.

(56) References Cited

U.S. PATENT DOCUMENTS

| | | | |
|---|---|---|---|
| 6,144,893 | A | 11/2000 | Van der Vegt et al. |
| 6,473,721 | B1 | 10/2002 | Chacon |
| 6,978,222 | B2 | 12/2005 | Roser |

(Continued)

FOREIGN PATENT DOCUMENTS

| | | | |
|---|---|---|---|
| FR | 2878353 | A1 | 5/2006 |

OTHER PUBLICATIONS

International Search Report of PCT/US19/50290, dated Nov. 20, 2019.

*Primary Examiner* — Kamini S Shah

(74) *Attorney, Agent, or Firm* — Davidson Kappel LLC

(57) ABSTRACT

The present invention includes: (a) a method for improving data to be processed for bottleneck detection, by cleaning corrupt or outlier data; (b) a method for improved analysis of bottleneck data using a plurality of rules for categorization; and (c) a method for improved display and/or allowing improved user feedback for bottleneck data using multivariate analysis and display. These methods can be used alone, or preferably be combined in whole or in part together to improve performance of an industrial process. A system is also provided.

11 Claims, 8 Drawing Sheets

(56) References Cited

U.S. PATENT DOCUMENTS

| | | | |
|---|---|---|---|
| 2005/0015176 A1 | 1/2005 | Harada et al. | |
| 2005/0040223 A1 | 2/2005 | Yigit et al. | |
| 2005/0066056 A1 | 3/2005 | Dominic et al. | |
| 2006/0191993 A1* | 8/2006 | Markham | G06Q 10/00 235/376 |
| 2007/0220368 A1 | 9/2007 | Jaw et al. | |
| 2009/0204267 A1 | 8/2009 | Sustaeta | |
| 2015/0148933 A1 | 5/2015 | Huang et al. | |
| 2016/0217399 A1 | 7/2016 | Roelofs et al. | |
| 2018/0356790 A1 | 12/2018 | Vsrtak et al. | |

* cited by examiner

INDUSTRIAL BOTTLENECK DETECTION AND MANAGEMENT METHOD AND SYSTEM

This is a Continuation U.S. patent application Ser. No. 17/268,255 (published as U.S. 2021/0173387 A1) filed on Feb. 12, 2021 which is a National Phase Application of PCT/US2019/050290, filed on Sep. 10, 2019 and claims the benefit of U.S. Provisional Patent Application No. 62/729,729, filed Sep. 11, 2018. All of which are hereby incorporated by reference herein.

BACKGROUND

Many industrial processes are concerned with eliminating bottlenecks and improving quality and speed of the industrial process, for example Taiichi Ohno's well-known Toyota Production Systems. Many of today's methods for bottleneck detection still require physical inspection and manual analysis from industrial database systems to help reduce costs associated with assets, liabilities, inventory, and general working capital in industrial environments. These problems are most frequently found in manufacturing and supply chain environments. Management professionals and engineers, both internal and external, spend days to months determining appropriate process improvement methodologies to help control operations. These professionals classify various nodes and steps within an end-to-end process to determine which sectors are operating at undercapacity and overcapacity, and hence affecting overall system throughput. These professionals also determine which sections of a process are stable and unstable based off various statistical checks and best practices that involve processing readily available data for verification. After verification, these management professionals and engineers are required to report and share resolutions to prevent reoccurrences of bottlenecks. Some of the results include reduction of assets, increase of productivity, and shorter cycle and lead times. The industries that engage such methods include, but are not limited to, automobile, aerospace, agriculture, oil, energy, semiconductor, logistics, packaging, general manufacturing, banking, insurance, healthcare, transportation and general supply chain.

In such conventional systems, data are siloed, unaggregated, and unprepared for bottleneck analysis. Professionals typically manually collect, then transform the data, prior to employing any software analytical packages, including but not limited to, statistical packages, mathematical packages, business intelligence, and subdivisions of artificial intelligence. The data often are visually analyzed with recommendations made through snapshots of periodic, and therefore not continuous, samples. Oftentimes, databases and processes must be connected using integrations prior to analysis of both isolated and holistic bottleneck issues.

Software analytical packages are described for example in previous patent literature.

U.S. Pat. No. 6,978,222 for example describes an embodiment that performs bottleneck analysis using data continuously updated as the operation of a non steady state system progresses. Data is taken from a manufacturing system with seven machines for example.

U.S. Pat. No. 6,473,721 discloses a factory traffic monitoring analysis apparatus and method to identify actual and potential capacity constrained stations or stations with high traffic variability.

U.S. Patent Application No. 2005/0040223 discloses a system for visually displaying bottlenecks in real time, with bottlenecks being identified if a resource utilization is close to 100 percent.

Cost optimization has also been used, for example in U.S. Pat. No. 6,144,893, in order to prioritize bottleneck problems.

These processes however typically have had limited applicability and have not resulted in significant reduction of manual analysis of bottlenecks in most industrial processes.

SUMMARY OF THE INVENTION

An object of the present invention is to rapidly determine problems and bottlenecks in industrial processes to allow for better bottleneck management, prioritization of tasks, documentation of best practices, and/or the acceleration of resolutions.

The present invention provides a computer-based method to digitally discover process bottlenecks in industrial and commercial environments to prioritize, rank, and alleviate issues in real-time.

The present invention also provides a system, referred to as an Industrial Bottleneck Detection and Management System (referred to as "IBDMS" herein), for performing the method.

More specifically, the present invention has several novel aspects, and provides at least three separate novel methods: (a) a method for improving data to be processed for bottleneck detection; (b) a method for improved analysis of bottleneck data; and (c) a method for improved display and/or allowing improved user feedback for bottleneck data. These methods can be used alone, or preferably be combined in whole or in part together to improve performance of an industrial process.

The present invention thus provides a method for improving data to be processed by a bottleneck detection system comprising:

- receiving in a processor a plurality of data items related to an industrial process, each data item being time stamped so that each data item includes time stamp and industrial process data regarding an industrial process occurring at the time;
- identifying in the processor corrupt or outlier industrial process data or corrupt time stamp data of the data items;
- providing the plurality of data items excluding data items having the identified corrupt or outlier industrial process data or corrupt time stamp data to permit performing in the processor at least one statistical calculation;
- discarding data items with corrupt industrial process data or time stamp data; and
- providing the plurality of data items including items with the outlier industrial process data but without the discarded data items to be able to be used to identify abnormal patterns or behaviors.

This method advantageously allows for clean data to be provided to further analysis systems or for further analysis methods, most preferably to the IBDMS and the further analysis methods describe herein.

The method for improving data advantageously can occur in real time, so that continual clean data can be provided. Thus, even if a sensor or clock of the IBDMS malfunctions, the overall system can continue running.

The outlier industrial process data can be determined by the IBMDS by first identifying the type of data distribution (eg normal, binomial, exponential etc) being received and using a cumulative density function (cdf) beyond 0.997 (mean+3 standard deviations) to identify outliers. For defect rate, IBDMS defaults to a p control chart which assumes binomial distribution. The data with the outlier industrial process data are then removed from the data for statistical calculations to prevent outliers from skewing the calculations. However, these data points are added back in to identify patterns and abnormal behaviors. Similarly, all the corrupt or inaccurate values are removed from the dataset prior to any analysis. Corrupt or inaccurate values includes data items containing null values, negative values, incorrect time stamps etc. These data items are not added back into the dataset. Incorrect time stamps can be determined for example via out of sequence data.

The at least one statistical calculation can include a mean calculation and/or standard deviation calculation on the plurality of data items excluding data items having the identified corrupt or outlier industrial process data or corrupt time stamp data. The results of these calculations preferably are then used for bottleneck detection.

The method may be performed by a data ingestion and preparation module of the IBMDS software. This data ingestion module requires data to be available in date format, where the first column has all date items. Date strings can include seconds, minutes, hours, days, months, and years. The remaining columns are individual processes or entities that are to be compared over time to determine bottlenecks and other potential problems. The cells include industrial process data that reflect time, length, quantities, dollars, mass, volume, and other units to be analyzed overtime. These cells can exist in vector formats in either databases or .csv files. The cells can be empty, null, or NA. The system can auto-correct missing and dirty data and ignore zero values. Additionally, there is a data prep module that allows users to auto-pivot and prepare datasets for upload/ingestion in the case the data is not delivered in the appropriate format for ingestion. Collectively these modules allow for any industrial time stamp data to be uploaded into the invention for data cleansing and analysis, whether on premise or on the cloud. The coding language can be in R, python, C, Java, Ruby, MATLAB, CSS or any language that the user of the invention feels comfortable with. Data is immediately dumped after analysis for security purposes.

Data input for the system and method can be any time stamp data available in industrial databases such as Enterprise Resource Planning, Manufacturing Execution System, Programmable Logic Controllers, Inventory Management Systems, Transportation Management Systems, Warehouse Management Systems, Sensors, Accounting System, Microsoft Excel & Access Databases, Invoices, and any general datasets that include time stamps and industrial process values associated to processes (including, but not limited to cycle time, quantities, lengths, volume, mass, dollar amounts, etc.).

The present invention also provides a method for improved analysis of bottleneck data, preferably the bottleneck data that has been processed as per the method for improving data described above.

The present invention thus provides a method for improved analysis of bottleneck data comprising:

- receiving in a processor a plurality of data items related to an industrial process, each data item being time stamped so that each data item includes time stamp and industrial process data regarding an industrial process occurring at the time, the plurality of data items preferably being the data items used for the statistical calculation discussed above;
- analyzing the plurality of data items in a processor via a plurality of rules, at least one of the rules identifying a violation as a function of at least one data item deviating more than a standard deviation from mean and a further of the rules identifying a further violation as a function of a plurality of the data items deviating consecutively from the further rule, the analyzing identifying at least type of pattern shift to create pattern shift data; and
- performing a multivariate analysis on both the plurality of data items and the pattern shift data to identify a bottleneck.

By providing rules as above, both short term and longer term bottlenecks and the identified shift data is analyzed further to aid in bottleneck detection.

Preferably, more than three, and up to eight rules or more are provided.

Preferably, the analyzing identifies both large and small shifts in the data, so that large pattern shift and small shift pattern shifts are identified.

The present invention can determine short-term, mid-term, and long-term bottlenecks related, but not limited, to Overall Equipment Efficiency, Inventory Variance, Machine Failure, Labor Efficiency, Labor Shortages/Allocation, Over-Inspection, Excess Waiting Time, Excess Process Time, Reducing Takt Delays, Lead Time Variance, Work Shift Resources Performance Management, Overproduction, Capacity Variance and many potential symptoms in real-time.

The present method can accelerate bottleneck detection and resolution for end users in various supply chain roles (including, but not limited to manufacturing) upto three orders of magnitude (1000 times) faster than human experts and manual efforts, and is more effective and precise than known methods noted in the Background section.

The present method can apply to all industrial sectors such as, but not limited to, automotive, aerospace, energy, healthcare, logistics, military, agriculture, etc. for bottleneck management. The present invention is also hardware compatible and can seamlessly integrate with Industrial Internet of Things packages. To a considerable extent, the present invention replaces the need for demand forecasting activities for supply chain, manufacturing, and procurement professionals. The present invention enables superior long-term value stream process mapping for available production data than current methodologies, such as but not only, Toyota Production System.

The present invention also provides a method for improved display and/or allowing improved user feedback for bottleneck data, comprising:

- receiving in a processor a plurality of data items related to an industrial process, each data item being time stamped so that each data item includes time stamp and industrial process data regarding an industrial process occurring at the time, the plurality of data items preferably being the data items used for the statistical calculation discussed above;
- performing a multivariate analysis on the plurality of data items in order to identify a bottleneck and contributing factors in the industrial process; and
- displaying the multivariate analysis including so that data showing the bottleneck and data showing no bottleneck are displayed.

Heat maps, charts and graphs operating in real time may be used for the display.

The present invention also permits in-house crowdsourcing by permitting comments and input to help automate short and long-term process improvement strategies for industrial & commercial environments. The present invention also can serve as a general auditing tool for supply chain professionals and enterprises to determine their individual needs for digitization and process integration. Notably, bottleneck detection automation using software programming and hardware installation are part of the process, but not the main process itself. The present invention can be a standalone solution, as well as a plug-in to existing solutions, such as industrial databases such as Enterprise Resource Systems, Manufacturing Execution Systems and Inventory Management Systems. Another objective of the present invention is to streamline this process through software, and when required hardware, automation to help collect, cleanse, analyze, and provide recommendations from the industrial data, often found in times series format. Data can be either static, dynamic, or continuous. Services such as artificial intelligence, process analytics, digitization, predictive analytics, blockchain, and cryptographic ledgers, will be supplementary components to further enhance this invention's ability to improve throughput and reduce all visible and invisible bottlenecks.

The present invention can apply to all enterprise, on-premise, web, mobile, and general database applications and to most manufacturing, supply chain, and storage facilities in commercial, public, or private use.

BRIEF DESCRIPTION OF THE DRAWINGS

The present invention will be described in more detail with respect to an embodiment in which.

DETAILED DESCRIPTION

Figure 1:
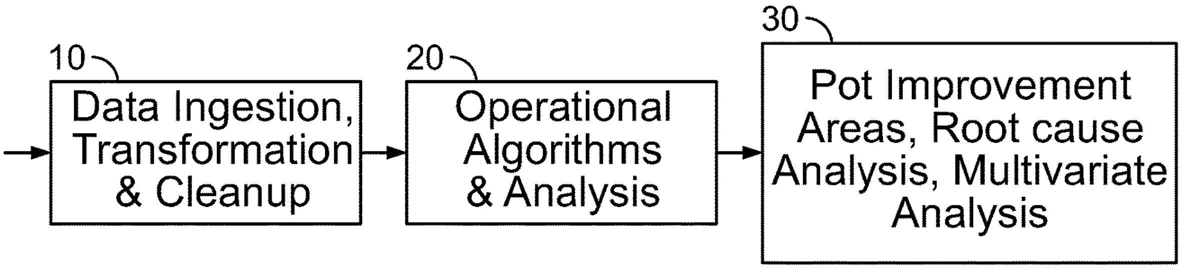
FIG. 1 shows a flowchart of the IBDMS data analysis.

As shown in FIG. 1, an overall process of the present invention has three main parts, each with a plurality of subcomponents and sub-processes. The first part includes a data cleansing module 10 that prepares data to be ingested in real-time, preferably, but not limited to, on a cloud or on-premise server. The second part includes a bottleneck detection system 20, that runs a series of statistical and operational capacity tests to determine bottleneck in real-time, predict future bottlenecks, and split tasks based on the Pareto Principle or a custom split. The third part includes front-end automated analysis dashboards 30 that provide real-time continuous improvement suggestions to alleviate bottlenecks and ensure long-term throughput. One of the subcomponents of this third part is a bottleneck resolution management system that allows users to digitally classify types of bottlenecks, input resolutions, and collaborate on shared learnings. Collectively, the data generated from the present invention creates unique, defensible insights around bottleneck resolution on a secure system.

Data preparation & cleansing module 10 prepares data to be ingested and cleansed in real-time, preferably, but not limited to, on a cloud or on-premise server. Preferably, there are at least 500 data points per process for statistical significance. However, available datapoints do not limit the value, usefulness, and practicality of the invention. The present invention can for example cover up to and more than 20 million data points per process stream, up to 100 years of data, and up to 10,000 iterative loops of the algorithm.

The first subcomponent of the first part involves a data ingestion and preparation module. This data ingestion module requires data to be available in date format, where the first column has all date items. Date strings can include seconds, minutes, hours, days, months, and years. The remaining columns are individual processes or entities that are to be compared overtime to determine bottlenecks and other potential problems. The cells include industrial process data that reflect time, length, quantities, dollars, mass, volume, and other units to be analyzed overtime. These cells can exist in vector formats in either databases or .csv files. The cells can be empty, null, or NA. The system can auto-correct missing and dirty data and ignore zero values. Additionally, there is a data prep module that allows users to auto-pivot and prepare datasets for upload/ingestion in the case the data is not delivered in the appropriate format for ingestion. Collectively these modules allow for any industrial time stamp data to be uploaded into the invention for data cleansing and analysis, whether on premise or on the cloud. The coding language can be in R, python, C, Java, Ruby, MATLAB, CSS or any language that the user of the invention feels comfortable with. Data is immediately dumped after analysis for security purposes. Datasets can be from 0 to 100 or more zetabytes of data, depending on computational needs.

The second subcomponent of the first part involves the upload sequence. The data for example can be uploaded to the invention as an ASCII, .csv file, SQL database file, or through any available API or integration method. The platform has capabilities to add additional file types as well. The system allows users to click a button to instantly upload the data set to be converted to a vector format to begin bottleneck detection and analysis. The bottleneck detection and bottleneck analysis can function as separate independent modules from each other, as well as sequential combined modules, depending on the user's requirements.

The third subcomponent of the first part involves the user's ability to define machine learning tuning parameters to subject the time stamp data set to. The present invention also can auto-assign machine-learning parameters if the user does not want analytical augmentation. The machine learning module allows users to split test and training data sample for any division from 0:100 to 100:0. The user can also specify the amount of data to use for analysis, from 0-100 zettabytes for current and future systems. By default, the system is set to 100 MB. Additionally, the user can also define metrics such as data gathering frequency, periods of time elapsed for collected data, sample size confidence interval, allowable deterministic variation, and appropriate units. Users can also select metrics to analyze in advance such as Cycle Time, Inventory Behavior, Machine Behavior, Work Shift Resources Performance Management, Overall Equipment Efficiency, etc. These parameters can be selected prior to clicking the execution or upload data command that can be a button or execution code line.

The fourth subcomponent of the first part involves automated data-cleansing once the data has been uploaded for ingestion. There is an automated data-cleansing algorithm that uses statistical methods such as, but not limited to, ARIMA (Auto-Regressive Integrated Moving Average) modeling and chemical process control methods to adjust for trend, seasonality, and noise. It is during this step as well that the present invention normalizes the data and eliminates outlier and false/empty cells from the analysis to cleanse the data. The data is converted from discrete element to a frequency domain to begin process operations management calculations for bottleneck detection.

The bottleneck detection system 20 runs a series of statistical and operational capacity tests to determine bottleneck in real-time, predict future bottlenecks, and split tasks based on Pareto Principle or custom split. The bottleneck detection system 20 applies heuristics and separation methodologies that discover, identify, classify, and alleviate bottlenecks in real-time.

The first subcomponent of the second part involves using automated statistical methods to determine stable and unstable processes using machine learning and model-fitting parameters. During this phase, data is tagged to be consistently erratic and unpredictable or smooth and predictable. This first check relies on process control theory to first flag immediate bottlenecks. This step separates out false positives for bottlenecks, so the next step can focus on capacity and utilization calculations.

The second subcomponent of the second part involves running mathematical calculations for bottleneck determination. One of the calculations run can include Little's Law to verify the relationship between inventory, time, and rate for independent processes. After several calculations to determine worst case utilization, observed capacity, and expected waste/savings potential, the system outputs these findings in tables and in natural language on the front-end dashboard for users to gain insights. Additional data and statistical transformations can be conducted to allow for time-based calculations of historical bottlenecks to allow the user to playback histories and predict future bottlenecks through an easily accessible tracking module. At this stage, all processes can be classified for bottleneck improvement potential, but not yet ranked.

The third subcomponent of the second part involves taking the previous bottleneck insights and outputs and ranking them in real-time tables from an easy to read and understandable front-end dashboard. The system calculates all current and previous instances of bottleneck metrics, such as, but not limited to, worst to best area operating rate, achievable performance KPIs (key performance indicators), value-added processes, non-value added but necessary processes and prints them in a current table. The system further uses separation principles such as Pareto Principle to separate out mission critical and non-mission critical tasks. The system is also able to flag high improvement potential areas and low improvement stable areas. The system also recommends resource allocation for better load balancing. The system also publishes generic visualizations such as line graphs, pie charts, and scatter plots for more traditional users.

The fourth subcomponent of the second part involves taking the bottleneck rankings and recommendations and converting them to a day-by-day history tracker. Using data separation techniques that essentially limit/cut/add data based on the time interval, end users can infer the change of bottleneck behavior and critical needs historically, while predicting the next bottlenecks. This tracker permits users to plan for short-term and long-term capital expenditure needs for recurring and occasional problems.

The front-end automated analysis dashboards 30 provide real-time continuous improvement suggestions to alleviate bottlenecks and ensure long-term throughput. Several components can be auto-generated or re-generated in the dashboards 30 from the bottleneck detection system 20 based off historical and real-time libraries. Thus, the third part and second part overlap, as the bottleneck detector outputs front-end recommendations simultaneously and in real-time.

The first subcomponent of the third part includes publishing smart KPIs that help end users, primarily, but not limited to, the supply chain space improves cycle time and reduce inventory, parts variance. Machine Learning algorithms and various advanced statistical methods that include Chi-Squared Tests, f-Tests, t-Tests, and Central Limit Theorem concepts are leveraged to print daily, weekly, monthly, quarterly, annually, and custom time-period performance metrics for end-users to benchmark physical performances against.

The second subcomponent of the third part includes a qualitative improvement recommendation engine. This highlights root causes and types of bottlenecks and prints/outputs to the dashboard likely causes to short-term, mid-term, and long-term bottlenecks. Some of the outputs are inspired from concepts from Total Quality Management and Toyota Production System, two philosophies used to continuously improve and alleviate bottlenecks, primarily waste. This improvement recommendation engine enables real-time load balancing insights of various distributions.

The third and final subcomponent of the third part and overall invention includes a resolution database system. In this system, users can assign action plans, record resolutions, share best practice within and across facilities, divisions, group policies, organizations, industries, and globally. This database continues to store resolutions to bottlenecks for future manual or automated retrieval. This final piece resolves and retrieves the most appropriate methodologies to fix appropriate bottlenecks from both public and private information system. This piece is bottleneck strategy automation. The value of this subcomponent allows organizations to crowdsource and externally source solutions in near real-time.

Collectively, the invention allows end users to:

1. Discover Bottlenecks
2. Classify Bottlenecks
3. Rank Bottlenecks
4. Identify Bottlenecks
5. Review Historical Bottlenecks
6. Predict Bottlenecks
7. Determine Root Causes and Correlations of various Bottlenecks
8. Store and Transmit Public and Private Bottleneck Data, Behavior, Reports
9. Place, Itemize, and Date Bottlenecks
10. Assign Action Items to Resolve Bottlenecks
11. Provide Recommendations to Resolve Bottlenecks
12. Allow Resolutions to recorded to resolve Bottlenecks and of resolved Bottlenecks
13. Reallocate resources for Bottlenecks
14. Share Resolutions and Best Practices of Bottlenecks
15. Use Artificial Intelligence and Machine Learning to accelerate Bottleneck Resolution per iteration of data input (up to or exceeding 1,000,000 iterations).
16. Automatically Resolve Bottlenecks in Real-Time 17. Continuously Resolve Bottleneck in Real-Time (Bottleneck Strategy Automation)

The present invention also can be modified and applied to specifically target inventory issues. Inventory is grouped as a type of bottleneck for the purposes of this document. An equivalent software module exists as outputted analysis that is also another subcomponent of the invention. Inventory and conflicting metrics can be simultaneously or independently be optimized to allow for the appropriate stocking and staffing levels at potential bottlenecks in real-time.

Example

The present invention may be better understood in view of a specific non-limiting example on improving quality by reducing defect rates. Specifically, an example in which defect data collected manually by workers in a manufacturing facility and analyzed by the IBDMS software to identify which of the shift and shift hours resulted in high defect rates.

A manufacturing facility wanted IBDMS software to identify root causes for high defect rates using hourly data collected manually containing information on how many good pieces and bad pieces were produced during an hour. IBDMS software was able to ingest raw defect data from csv files, clean and transform it without any manual intervention. IBDMS software analyzed the data by applying multiple heuristics, operational algorithms and machine learning models to identify potential improvement areas, abnormal patterns and behaviors and potential causes through multivariate analysis. The insights were displayed in easy to consume interactive dashboards.

The facility operated 24 hours a day for 5 days a week. Operating hours were divided into 3 shifts of 8 hours each. Work Shift 1 operated from 5 am to 1 pm, Work Shift 2 from 1 pm to 9 pm and Work Shift 3 from 9 pm to 5 am. The beginning hour of every shift is categorized as Work Shift hour 1; Second hour as Work Shift hour 2 and so forth. The final hour of each work shift is Work Shift hour 8. There is one record per given hour with total number of good pieces and bad pieces (or defective parts) produced during that hour. Good pieces and bad pieces add up to total pieces. Defect rate is calculated as bad pieces divided by total pieces.

Figure 2:
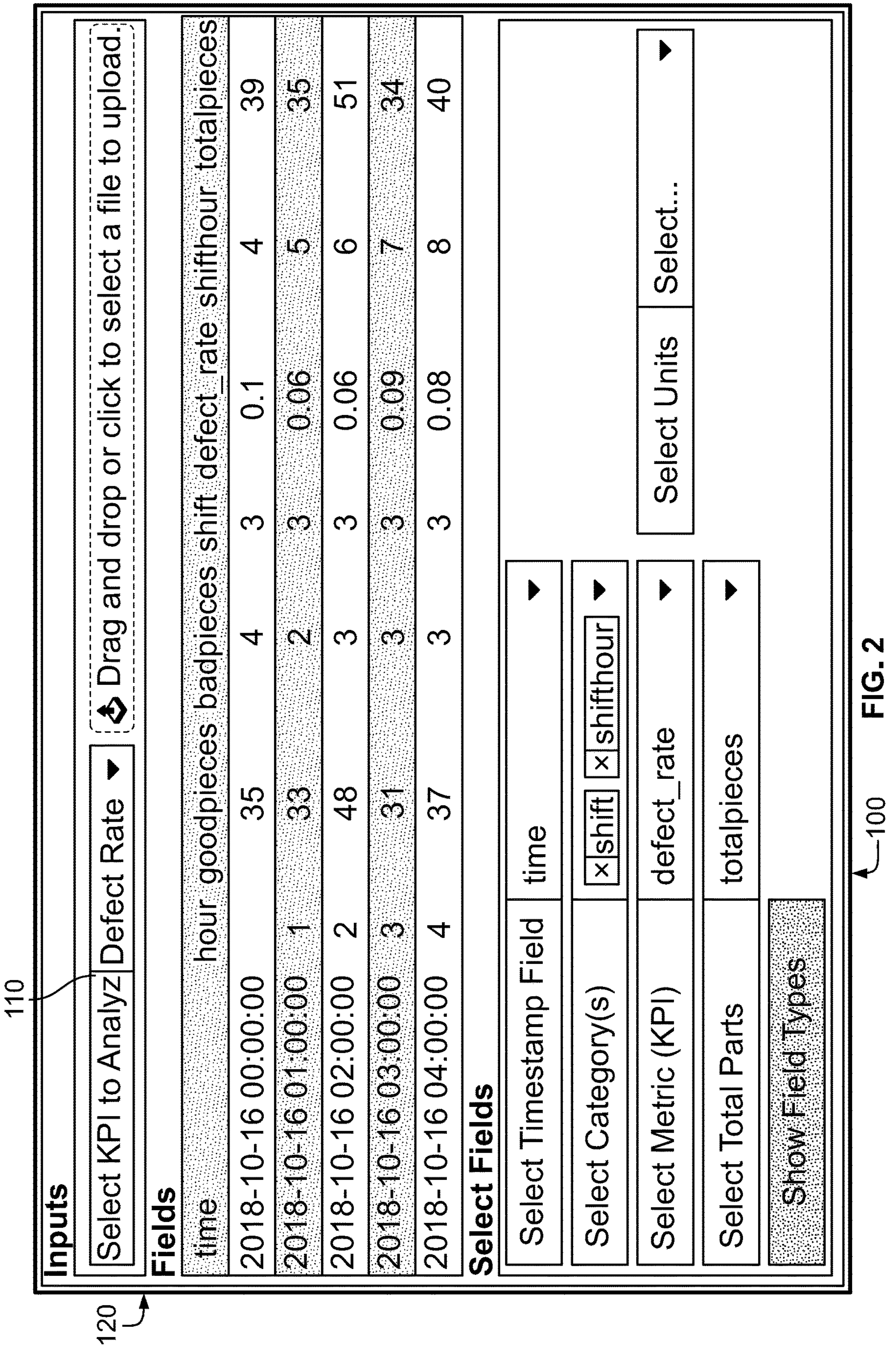
FIG. 2 illustrates data ingestion and mapping for defect data according to the IBDMS.

FIG. 2 shows a sample of uploaded dataset and GUI 100 that can be used to create charts and graphs to analyze the bottleneck data. A user can select a KPI to analyze at input field 110, and select categories of the data to analyze according to the KPI metric in a select field area 120. IBDMS software requires a minimum of three fields to be mapped as shown in the figure below—1) a time stamp field 2) a metric 3) one or more categories. For the defect dataset, time is mapped to time stamp field, defect_rate is mapped to metric, and shift & shifthour of the work shift is mapped as categories. In the case of defect rate, an additional field, sample size (or total parts) is required and mapped to totalpieces. IBDMS software analyzes the uploaded data based on the mapped fields.

The first step in analysis is data clean-up and outlier detection. IBDMS first determines the type of data distribution (eg normal, binomial, exponential etc) and uses cumulative density function (cdf) beyond 0.997 (mean+3 standard deviations) to identify outliers. For defect rate, IBDMS defaults to p control chart which assumes binomial distribution. These outliers are then removed from the data for statistical calculations to prevent outliers from skewing the calculations. However, these data points are added back in to identify patterns and abnormal behaviors. Similarly, all the corrupt or inaccurate values are removed from the dataset prior to analysis. Corrupt or inaccurate values include records containing null values, negative values, and incorrect time stamps. These datasets are not added back into the dataset.

IBDMS then performs statistical process chart analysis on the cleaned dataset to build a control chart. A control chart plots data points along a timescale along with Control limits or thresholds. The algorithms dynamically determines the upper and lower control limits based on the dataset. There are 6 control limits, three above the mean and three below the mean according to the specification below.

UCLC: Defect rate="Mean+1 std dev" (cdf=0.68)

UCLB: Defect rate="Mean+2 std dev" (cdf=0.95)

UCLA: Defect rate="Mean+3 std dev" (cdf=0.997)

LCLC: Defect rate="Mean−1 std dev" (cdf=0.32)

LCLB: Defect rate="Mean−2 std dev" (cdf=0.05)

LCLA: Defect rate="Mean−3 std dev" (cdf=0.003)

The algorithm uses standard statistical process control rules to categorize them as Rule 1 to Rule 8 violations.

Rule 1: Defect Rate above UCLA or below LCLA

Rule 2: 2 out of 3 consecutive values in UCLB and above or LCLB and below

Rule 3: 4 out of 5 consecutive values in UCLC and above or LCLC and below

Rule 4: 7 consecutive values above mean or below mean

Rule 5: 7 consecutive points trending upwards or downwards

Rule 6: 8 consecutive points with no points in UCLC or LCLC

Rule 7: 15 consecutive points in UCLC and LCLC

Rule 8: 14 consecutive points alternating up and down

Since low defect rates are considered desirable, lower control limits are ignored and only upper control limits are used to determine violations.

There are different causes behind each of these violations.

Rule 1 and Rule 2 violations are categorized as Large Pattern shifts. Possible causes for large pattern shifts are Wrong setup, Measurement error, Process step skipped or not completed, Power failure, Equipment breakdown, New person doing the job, etc.

Rule 3 and 4 are categorized as Small Pattern shifts. Possible causes for small pattern shifts are Change in setup procedure, maintenance program or work instruction, Different work shift or person gains greater skills, different measurement device or calibration, change in raw material etc.

Rule 5 is categorized as Trends and can result from tool wear or things such as temperature or cooling effects.

Rule 8 is categorized as Overcontrol and can result from continuous adjustment or changes to settings. Overcontrol can also signal manipulation of data by operator or person entering the data (so-called pencil whipping).

Rule 6 & 7 indicate multiple processes or factors impacting the metrics and do not provide any insight into root cause.

Figure 3:
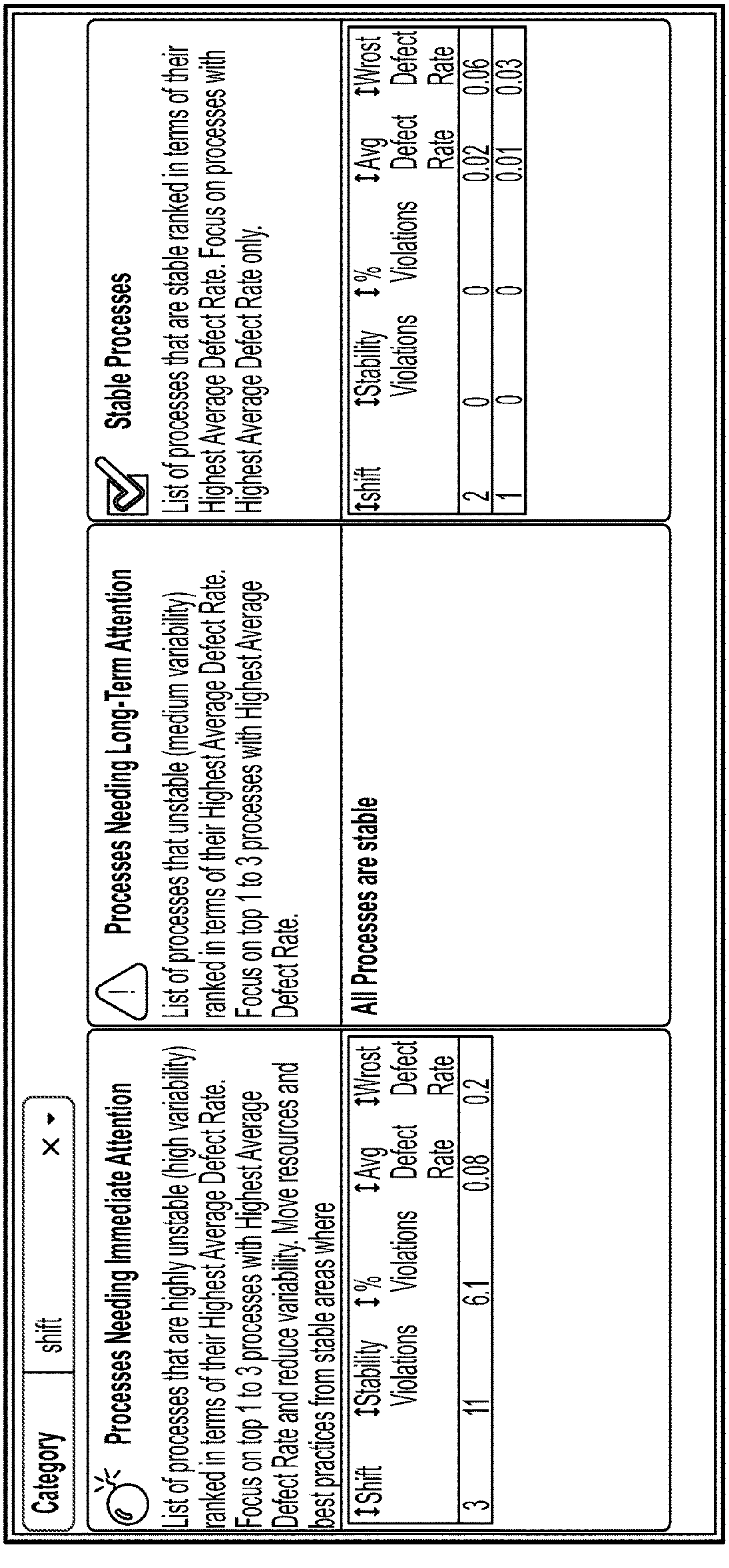
FIG. 3 illustrates shift data categorized into Red (left), Orange (center) and Green (right) buckets for defect rate analysis.
Figure 4:
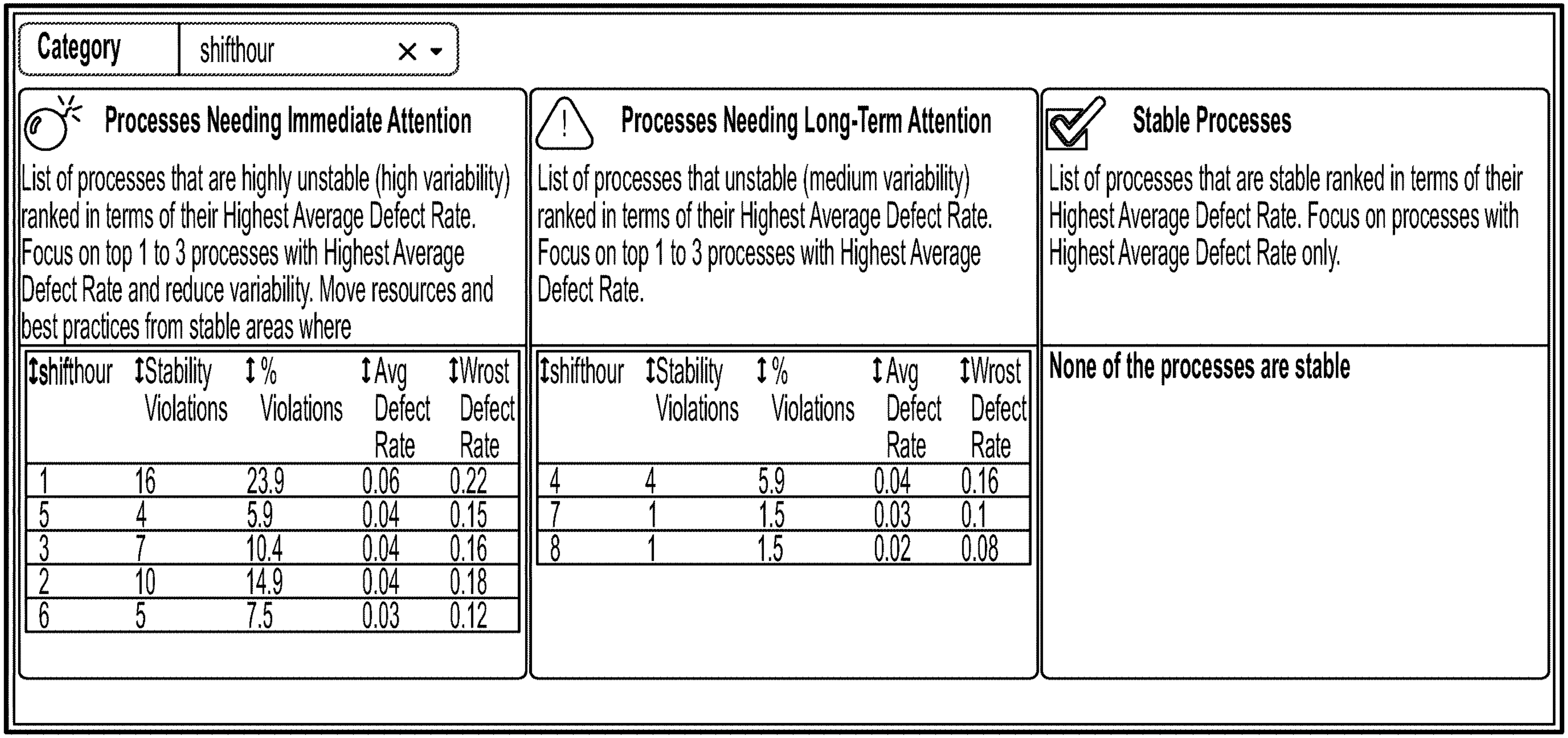
FIG. 4 shows shift hour categorized into Red (left), Orange (center), Green (right) buckets for defect rate analysis.

Potential (Pot) Improvement Areas:

Based on the FIG. 2 GUI selection of work shift and work shift hours being selected as the categories for KPI defect rate analysis, IBDMS provides information as shown in FIG. 3 and FIG. 4.

For example as shown in FIG. 3, Work Shift 1 had zero violations out of 181 data points; Work Shift 2 had zero large shifts and 7 small shifts out of 76 data points whereas Shift 3 had 11 large shift violations and 5 small shifts out of 181 data points. IBDMS software categorizes these Work Shifts into three buckets by segmenting these categories using pareto analysis on variability. Any Work Shift with zero percent large pattern shift violation goes into in the Green (right) bucket whereas the rest is split 80/20 based on percent violation. Therefore Work Shift 3 is shown in the Red (left) bucket whereas Work Shift 1 and 2 are in the Green (right) Bucket.

As shown in FIG. 3, the logic above, IBDMS software is able to very quickly identify that Work Shift 3 has high variability and need immediate attention whereas Work Shift 1 and Work Shift 2 are stable and do not need immediate attention. This has been validated on the ground by Operations Manager who indicated that the operators in Shift 3 were less experienced. Subsequently, by retraining Work Shift 3 Operators the plant was able to reduce defect rates.

Similarly, IBDMS software as shown in FIG. 4 categorizes the Work Shift Hour into three buckets and shows that Work Shift Hours 1, 5, 3, 2, 6 (generally earlier) need immediate attention (Red or Left Bucket) whereas Work Shift Hours 4, 7, 8 (later shifts) require less attention (Orange or middle Bucket). Based on the analysis, the defect rate are higher at the start of the shift and gradually decrease by Shifthour. This was again validated on the ground as this was identified to be a result of warm-up effect and handover problem.

Bottleneck Management System & Root Cause Analysis:

Having a methodology to understand when processes are not performing to expectations based on performance of other similar processes (benchmarking) and to its own historical performance is critical to solving underlying cause. IBDMS software highlight's processes that are out of control (abnormal behavior), sustained low performances (small shifts), continuous degradation or improvement (trends) and constant manual intervention (overcontrol).

Figure 5:
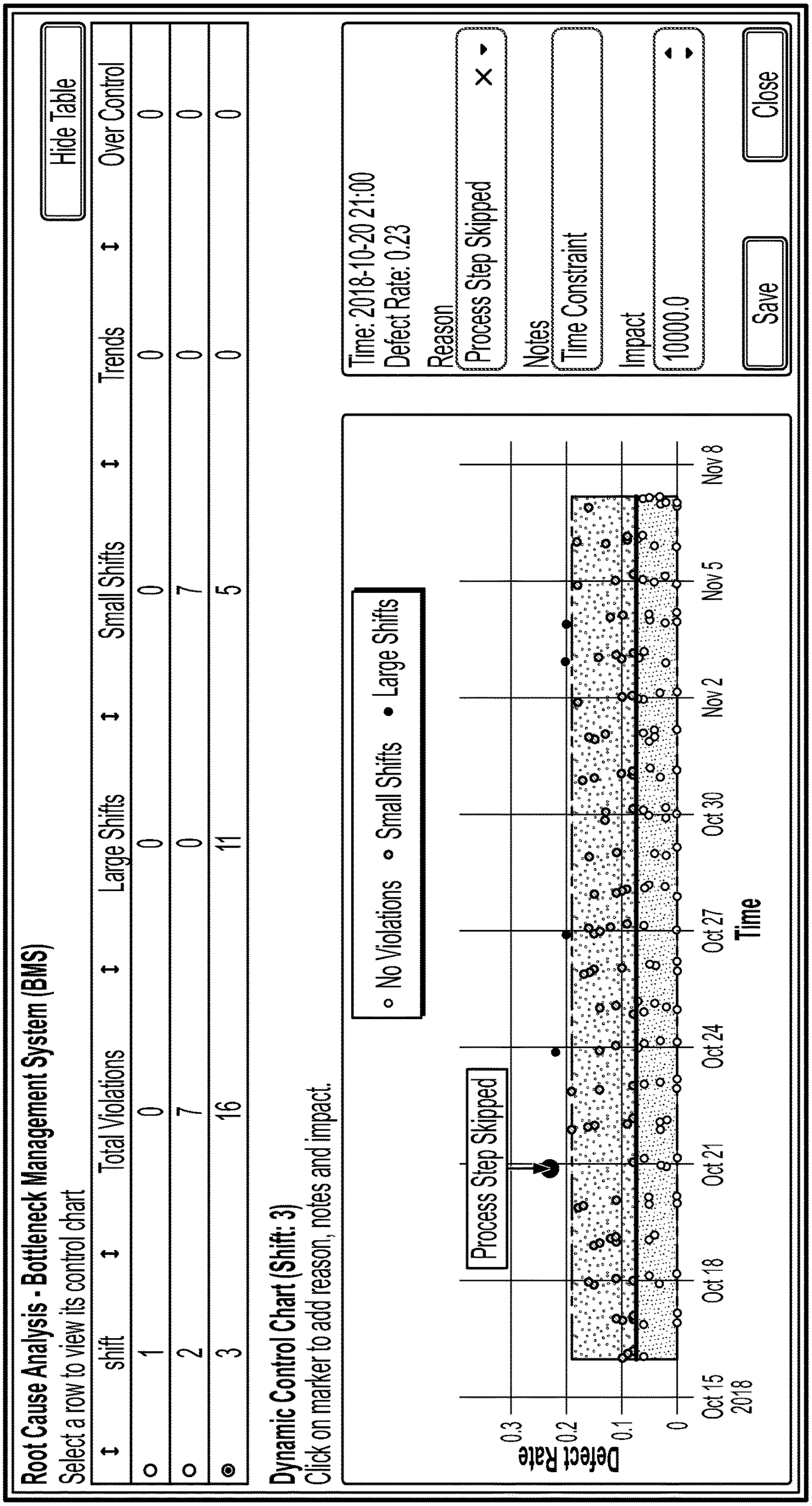
FIG. 5 shows a GUI or Bottleneck Management Dashboard for Defect Rate Data.
Figure 7:
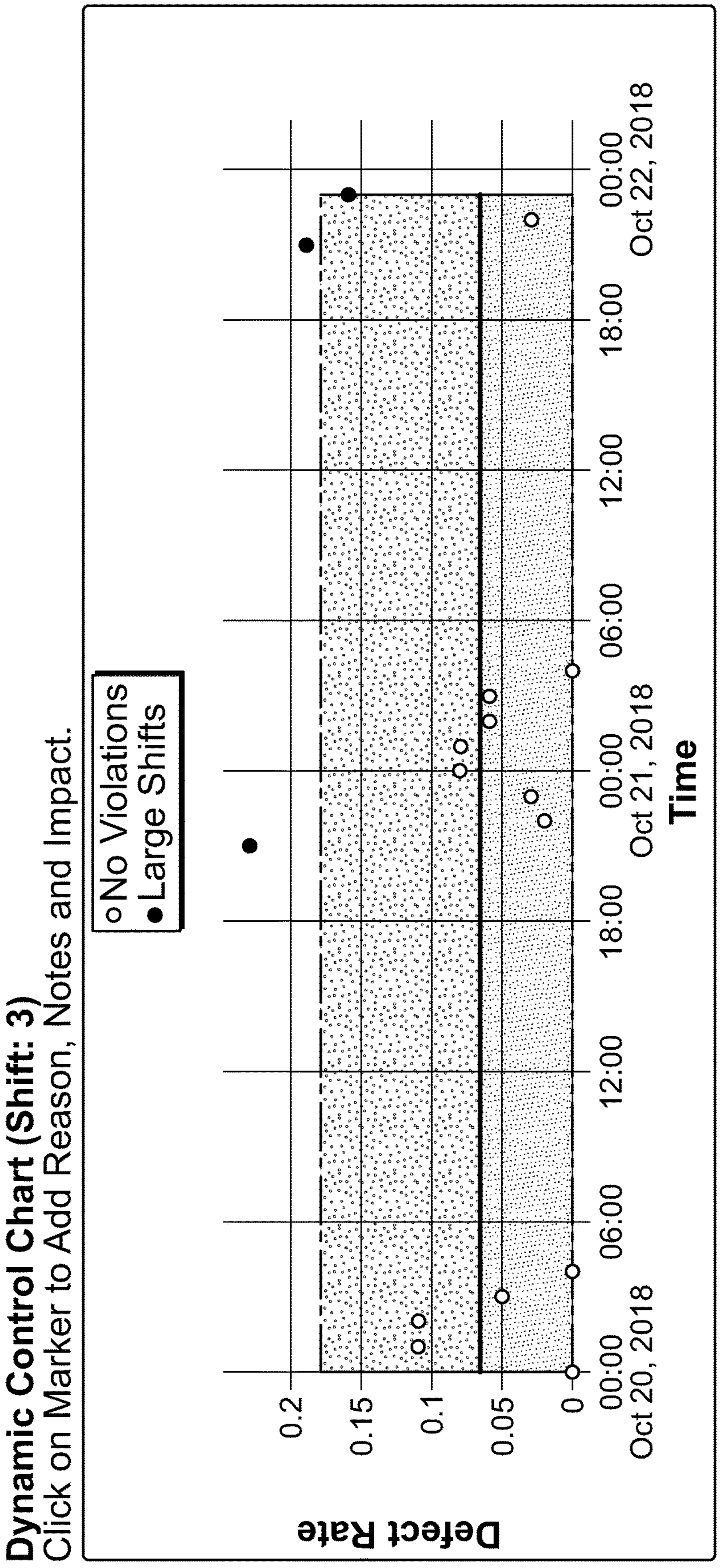
FIG. 7 shows a bottleneck Management Dashboard for Defect Rate Data (Sample Dataset) allowing for user input.

FIGS. 5 and 7 show statistical process control chart over the time period for the selected work shift (Work Shift 3) of the uploaded data with time on X-axis and defect rate on Y-axis. The black line (defect rate=0.072) is the mean. The upper red dotted line (defect rate=0.19) is the upper control limit (UCLA). The lower red dotted line (defect rate=0) is the lower control limit (LCLA).

Based on different rule sets, each of the data points is classified as either "No Violation", "Large Shift", "Small Shifts", "Trends" and "Overcontrol". Hovering over any point in the Dynamic Control Chart shown allows the user to select a reason for the violation from a list of recommended potential causes based on the type of violation and other factors specific to the dataset being analyzed. The user is able to enter reason code, add notes and potential impact resulting from the violation. The operator input becomes part of the repository that can be shared across the facility enabling knowledge sharing and collaboration. Other team members can look at the violations, potential causes for these violations and remedies or solutions that worked for these violations. The key benefit of the Bottleneck Management System is for the platform to dynamically highlight all out of control events or violations and share the potential causes and solutions for such violations.

Contributing Factors Insights through Multivariate Analysis:

A variety of factors can impact process performance. Some of the factors such as date, hour of day etc. are available in the dataset, others such as work shift, work shifthour, day of week, weekend etc have to derived. Similarly, while metrics such as good pieces, bad pieces, and defect rate are available in the dataset, signals such as violations have to be determined by applying process control algorithms and machine learning models. Determining which factors affect or contribute to the performance is important to prioritize resources.

Figure 6:
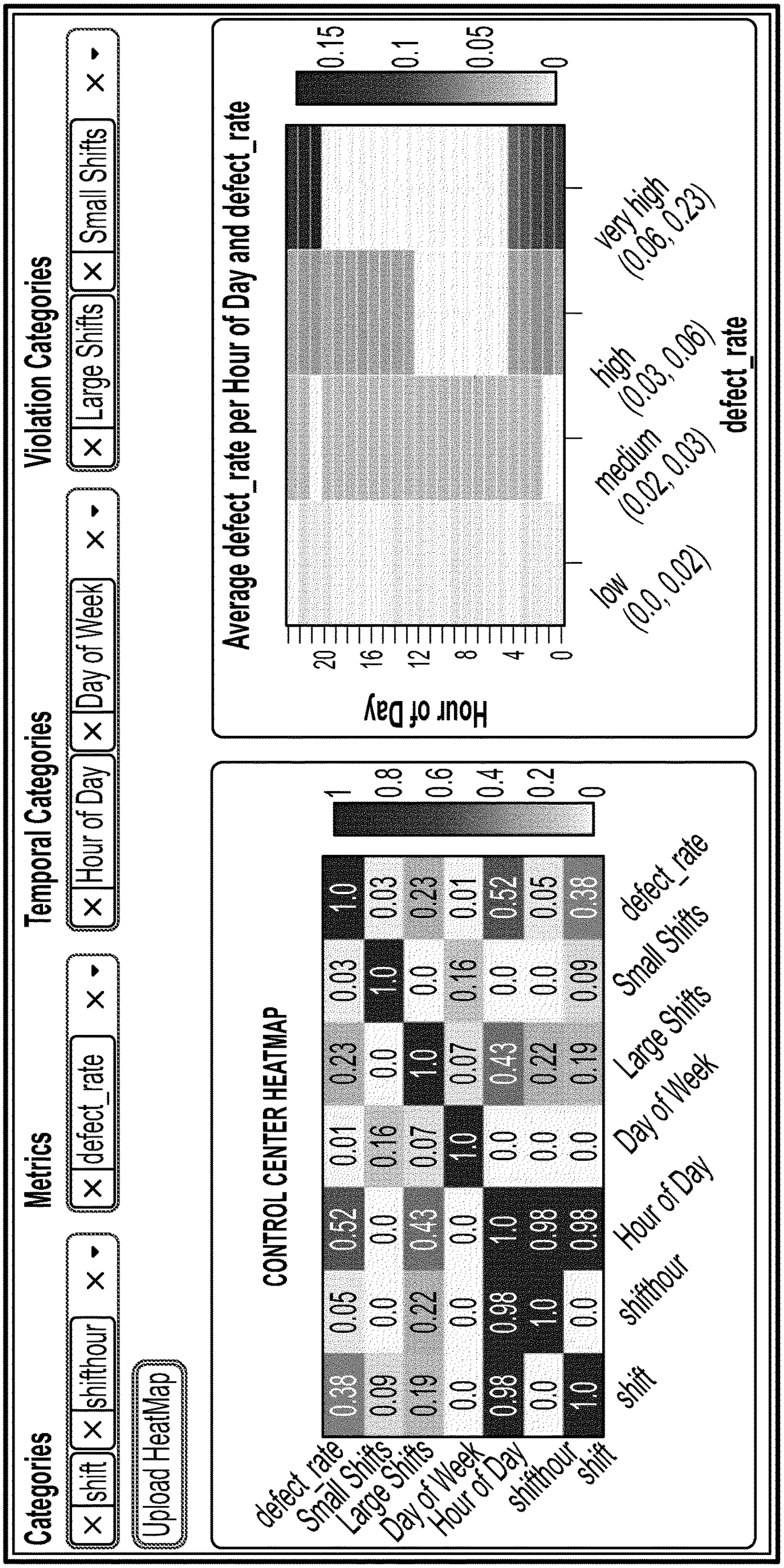
FIG. 6 shows a multivariate analysis for Defect Rate Data (Effect of Hour of Day on Defect Rate)

As shown in FIG. 6, IBDMS not only gives a bird's eye view of relationship (co-relations) between multiple categories, metrics and temporal variables to quickly identify major contributing factors behind reduced performance (higher defect rate) but provides drill down capabilities to understand granular relationships between any two variables. The control center heat map shows the multivariate analysis. For this given scenario, it was identified that Hour of day has the largest impact on the defect rate (correlation=0.52) and large shifts (0.43). Having the large pattern shift and small pattern shift data as part of the multivariate analysis is thus highly advantageous. A detailed view of defect rate (FIG. 6: Right Graph) as a function of hour shows that defect rate is highest during late night hours (9 pm to 3 am). By focusing on the hours with highest defect rates, either by shifting resources, training personnel or higher level of oversight can drastically reduce the overall defect rates.

After addressing the top contributing factor, the software recommends to focus on the next largest contributing factor. Day of Week is correlated to Small Pattern shifts (0.16). By understanding on which days small shift violations occur can help address them. Small pattern shifts can result from things such as change in setup procedure, maintenance program or work instruction, different shift or person gains greater skills, different measurement device or calibration, change in raw material etc. Following up on process on those days can help reduce these violations.

By ingesting dataset containing just a few columns (time, good pieces, bad pieces), the software is able to identify which Work Shift and Work Shifthours were problematic and needed attention, identify specific out of control events, tag and share reasons for those events and understand the major contributing factors for defect rates.

Sample Calculations

Table 1 shows sample data for Work Shift 3 to demonstrate the calculations used to determine Violations.

The mean and standard deviation (std) are first calculated based on the whole dataset. The defect rate mean is 0.07563. The standard deviation for a p-control chart is calculated as (https://www.spcforexcel.com/knowledge/attribute-control-charts/p-control-charts)

$$\text{std}=\sqrt{(\text{mean}\times(1-\text{mean})/\text{sample size})}$$

The average (totalpieces) sample size=41.75

$$\text{std}=\sqrt{(0.07563\times(1-0.07563)/41.75)}$$

$$\text{std}=0.041$$

$$\text{The Upper Control Limit}=\text{mean}+3\times\text{std}=0.1986$$

Based on this, the 6th row (times=10/20/18 21:00; defect_rate=0.23) is an outlier. This row is removed from the dataset is removed to recalculate the mean and standard deviation.

TABLE 1

| Sample Shift 3 data to demonstrate calculations. | | | | | | | | |
|---|---|---|---|---|---|---|---|---|
| Row No | time | hour | goodpieces | badpieces | defect_rate | shift | shifthour | totalpieces |
| 1 | Oct. 20, 2018 0:00 | 0 | 36 | 0 | 0 | 3 | 4 | 36 |
| 2 | Oct. 20, 2018 1:00 | 1 | 49 | 6 | 0.11 | 3 | 5 | 55 |
| 3 | Oct. 20, 2018 2:00 | 2 | 32 | 4 | 0.11 | 3 | 6 | 36 |
| 4 | Oct. 20, 2018 3:00 | 3 | 42 | 2 | 0.05 | 3 | 7 | 44 |
| 5 | Oct. 20, 2018 4:00 | 4 | 46 | 0 | 0 | 3 | 8 | 46 |
| 6 | Oct. 20, 2018 21:00 | 21 | 31 | 9 | 0.23 | 3 | 1 | 40 |
| 7 | Oct. 20, 2018 22:00 | 22 | 44 | 1 | 0.02 | 3 | 2 | 45 |
| 8 | Oct. 20, 2018 23:00 | 23 | 35 | 1 | 0.03 | 3 | 3 | 36 |
| 9 | Oct. 21, 2018 0:00 | 0 | 49 | 4 | 0.08 | 3 | 4 | 53 |
| 10 | Oct. 21, 2018 1:00 | 1 | 33 | 3 | 0.08 | 3 | 5 | 36 |
| 11 | Oct. 21, 2018 2:00 | 2 | 32 | 2 | 0.06 | 3 | 6 | 34 |
| 12 | Oct. 21, 2018 3:00 | 3 | 45 | 3 | 0.06 | 3 | 7 | 48 |
| 13 | Oct. 21, 2018 4:00 | 4 | 32 | 0 | 0 | 3 | 8 | 32 |
| 14 | Oct. 21, 2018 21:00 | 21 | 38 | 9 | 0.19 | 3 | 1 | 47 |
| 15 | Oct. 21, 2018 22:00 | 22 | 36 | 1 | 0.03 | 3 | 2 | 37 |
| 16 | Oct. 21, 2018 23:00 | 23 | 36 | 7 | 0.16 | 3 | 3 | 43 |

The new mean and standard deviation for curated database are calculated below.

$$\text{average defect rate}=0.06533$$

$$\text{average sample (totalpieces) size}=41.87$$

$$\text{std}=(0.06533\times(1-0.06533)/41.87)$$

$$\text{std}=0.0382$$

$$\text{The Upper Control Limit}=\text{mean}+3\times\text{std}=0.06533+3\times 0.0382=0.1799$$

Based on this analysis, Row 6 and 14 are outside the new upper control limit and therefore flagged as Rule 1 violation. Although Row 16 is within upper control limit, Row 14 and 16 are flagged for Rule 2 (2 out of 3 points outside mean+2 standard deviations) and therefore categorized as large pattern shifts.

Table 2 shows mean, standard deviation, UCLA, UCLB, UCLC and Rule 1 and Rule 2 violations for the sample dataset.

FIG. 7 shows the violations graphically on uploading the sample dataset into the IBDMS software.

Figure 8:
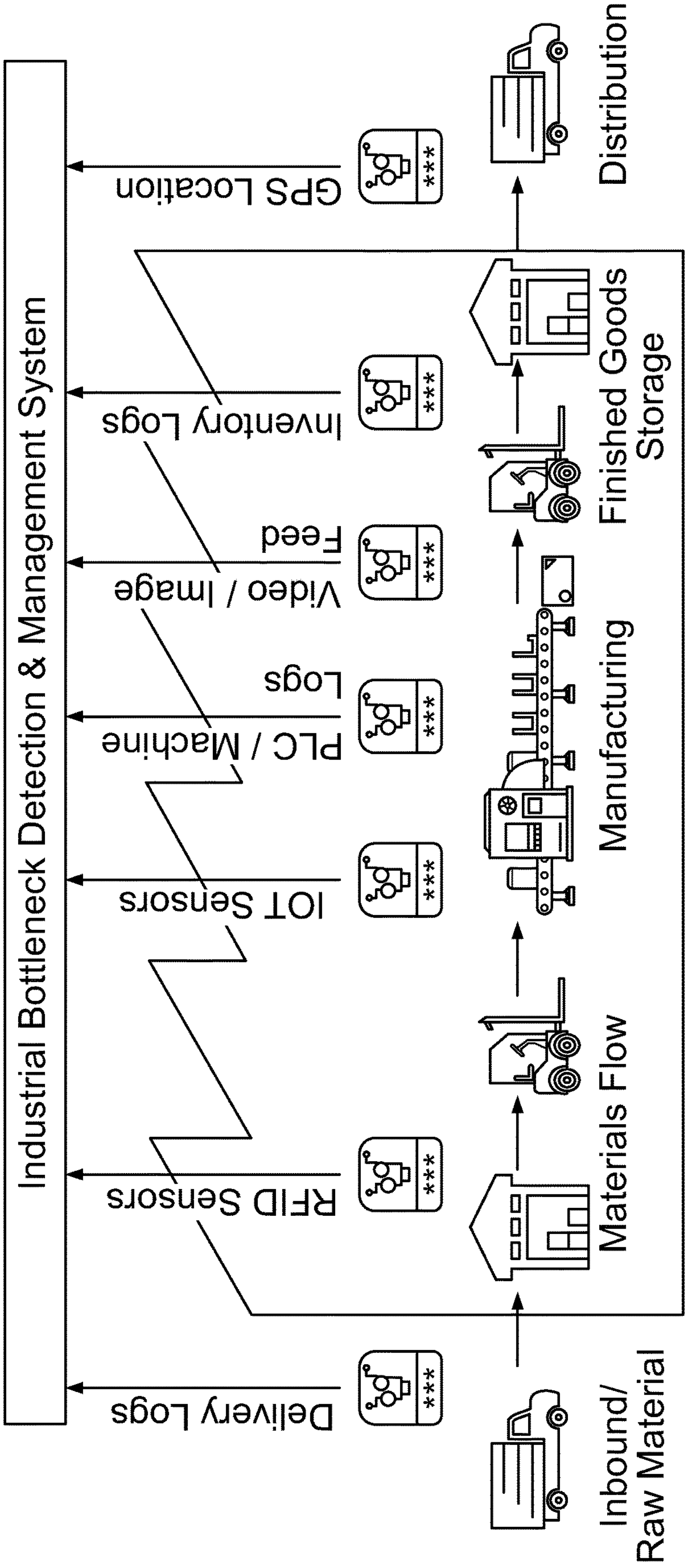
FIG. 8 shows an overview of IBDMS applicability across different parts of a supply chain.

FIG. 8 shows a schematic of the IBDMS which can be used at various locations in the an industrial process.

Although the invention has been explained in relation to its preferred embodiment, it is to be understood that many other possible modifications and variations can be made without departing from the spirit and scope of the invention. Obvious changes, modifications, and substitutions may be made by those skilled in the art to achieve the same purpose as the invention. The exemplary embodiments are merely examples and are not intended to limit the scope of the invention. It is intended that the present invention cover all other embodiments that are within the scope of the descriptions and their equivalents.

What is claimed is:

1. A method for improving data to be processed by a bottleneck detection system comprising the steps of:

receiving in a processor a plurality of data items related to an industrial process, each data item being time

TABLE 2

| Rule 1 and 2 Violations for the sample dataset | | | | | | | | | | | |
|---|---|---|---|---|---|---|---|---|---|---|---|
| Row No. | shift | time | defect_rate | shifthour | mean | std | UCLA | UCLB | UCLC | Rule 1 | Rule 2 |
| 1 | 3 | Oct. 20, 2018 0:00 | 0 | 4 | 0.0653 | 0.0382 | 0.1799 | 0.1417 | 0.1035 | FALSE | FALSE |
| 2 | 3 | Oct. 20, 2018 1:00 | 0.11 | 5 | 0.0653 | 0.0382 | 0.1799 | 0.1417 | 0.1035 | FALSE | FALSE |
| 3 | 3 | Oct. 20, 2018 2:00 | 0.11 | 6 | 0.0653 | 0.0382 | 0.1799 | 0.1417 | 0.1035 | FALSE | FALSE |
| 4 | 3 | Oct. 20, 2018 3:00 | 0.05 | 7 | 0.0653 | 0.0382 | 0.1799 | 0.1417 | 0.1035 | FALSE | FALSE |
| 5 | 3 | Oct. 20, 2018 4:00 | 0 | 8 | 0.0653 | 0.0382 | 0.1799 | 0.1417 | 0.1035 | FALSE | FALSE |
| 6 | 3 | Oct. 20, 2018 21:00 | 0.23 | 1 | 0.0653 | 0.0382 | 0.1799 | 0.1417 | 0.1035 | TRUE | FALSE |
| 7 | 3 | Oct. 20, 2018 22:00 | 0.02 | 2 | 0.0653 | 0.0382 | 0.1799 | 0.1417 | 0.1035 | FALSE | FALSE |
| 8 | 3 | Oct. 20, 2018 23:00 | 0.03 | 3 | 0.0653 | 0.0382 | 0.1799 | 0.1417 | 0.1035 | FALSE | FALSE |
| 9 | 3 | Oct. 21, 2018 0:00 | 0.08 | 4 | 0.0653 | 0.0382 | 0.1799 | 0.1417 | 0.1035 | FALSE | FALSE |
| 10 | 3 | Oct. 21, 2018 1:00 | 0.08 | 5 | 0.0653 | 0.0382 | 0.1799 | 0.1417 | 0.1035 | FALSE | FALSE |
| 11 | 3 | Oct. 21, 2018 2:00 | 0.06 | 6 | 0.0653 | 0.0382 | 0.1799 | 0.1417 | 0.1035 | FALSE | FALSE |
| 12 | 3 | Oct. 21, 2018 3:00 | 0.06 | 7 | 0.0653 | 0.0382 | 0.1799 | 0.1417 | 0.1035 | FALSE | FALSE |
| 13 | 3 | Oct. 21, 2018 4:00 | 0 | 8 | 0.0653 | 0.0382 | 0.1799 | 0.1417 | 0.1035 | FALSE | FALSE |
| 14 | 3 | Oct. 21, 2018 21:00 | 0.19 | 1 | 0.0653 | 0.0382 | 0.1799 | 0.1417 | 0.1035 | TRUE | FALSE |
| 15 | 3 | Oct. 21, 2018 22:00 | 0.03 | 2 | 0.0653 | 0.0382 | 0.1799 | 0.1417 | 0.1035 | FALSE | FALSE |
| 16 | 3 | Oct. 21, 2018 23:00 | 0.16 | 3 | 0.0653 | 0.0382 | 0.1799 | 0.1417 | 0.1035 | FALSE | TRUE |

stamped so that each data item includes time stamp and industrial process data regarding an industrial process occurring at the time;

identifying in the processor corrupt and outlier industrial process data and corrupt time stamp data of the data items;

providing the plurality of data items excluding data items having the identified corrupt and outlier industrial process data and corrupt time stamp data to permit performing in the processor at least one statistical calculation;

discarding data items with corrupt industrial process data and time stamp data; and providing the plurality of data items including items with the outlier industrial process data but without the discarded data items to be able to be used to identify abnormal patterns or behaviors.

2. The method as recited in claim 1 wherein the receiving occurs continuously in real-time during the industrial process.

3. The method as recited in claim 1 wherein the identifying step includes first identifying a type of data distribution being received and comparing a cumulative density function to a cutoff to identify outliers.

4. The method as recited in claim 3 wherein the outlier industrial process data is identified when the cumulative density function is beyond a cutoff of mean plus 3 standard deviations.

5. The method as recited in claim 1 wherein identifying step identifies all null values and negative values for the industrial process data as corrupt industrial process data and all null values and negative values of time stamp data as corrupt time stamp data of the data items.

6. The method as recited in claim 1 wherein at least one statistical calculation includes a mean calculation or standard deviation calculation on the plurality of data items excluding data items having the identified corrupt or outlier industrial process data or corrupt time stamp data.

7. A method for improved analysis of bottleneck data comprising:

receiving in a processor a plurality of data items related to an industrial process, the plurality of data items having been processed according to the method as recited in claim 1, analyzing the plurality of data items in a processor via a plurality of rules, the analyzing identifying at least type of pattern shift to create pattern shift data; and performing a multivariate analysis on both the plurality of data items and the pattern shift data to aid in identifying causes of a bottleneck.

8. The method as recited in claim 7 wherein at least one of the rules identifies a violation as a function of at least one data item deviating more than a standard deviation from mean and a further of the rules identifies a further violation as a function of a plurality of the data items deviating consecutively from the further rule.

9. A method for improved display and/or allowing improved user feedback for bottleneck data, comprising:

processing bottleneck data as recited in claim 7;

displaying the multivariate analysis including so that data showing the bottleneck and data showing little or no bottleneck are displayed together.

10. The method as recited in claim 1 wherein the identifying step uses a first mean and a first standard deviation to identify outliers and the statistical calculation includes using a second mean and a second standard deviation different from the first mean and the first standard deviation.

11. The method as recited in claim 10 wherein the second standard deviation is less than the first standard deviation.

* * * * *